Aug. 7, 1945.        D. GREGG        2,381,346
REGULATOR
Original Filed Dec. 6, 1941    3 Sheets-Sheet 2
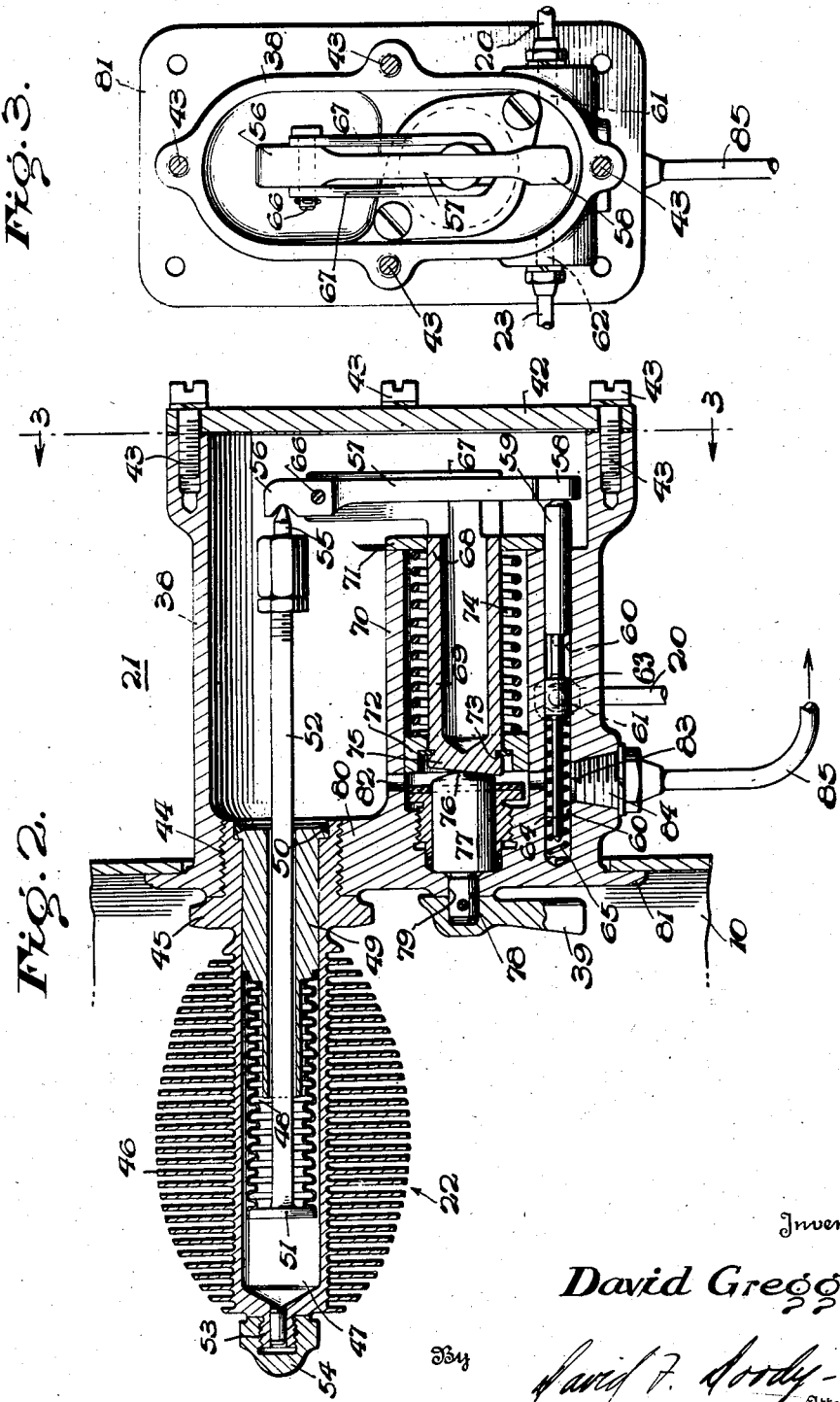
Inventor
David Gregg Aug. 7, 1945.  D. GREGG  2,381,346
REGULATOR
Original Filed Dec. 6, 1941  3 Sheets-Sheet 3
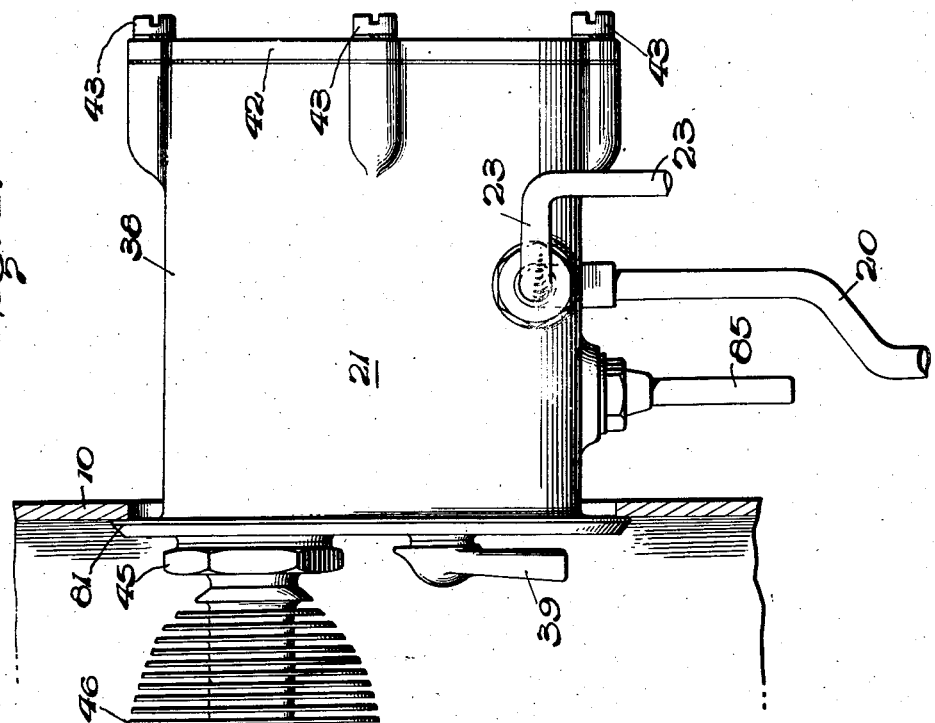
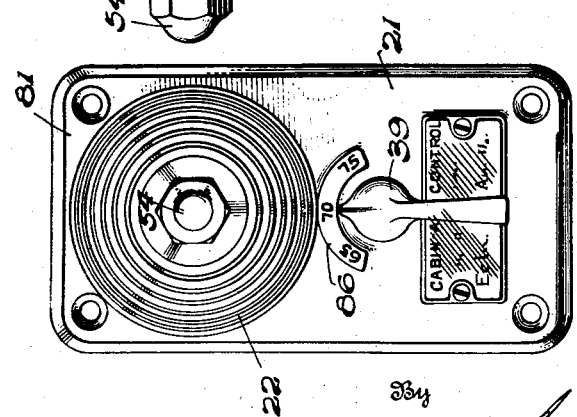
Inventor
David Gregg Patented Aug. 7, 1945

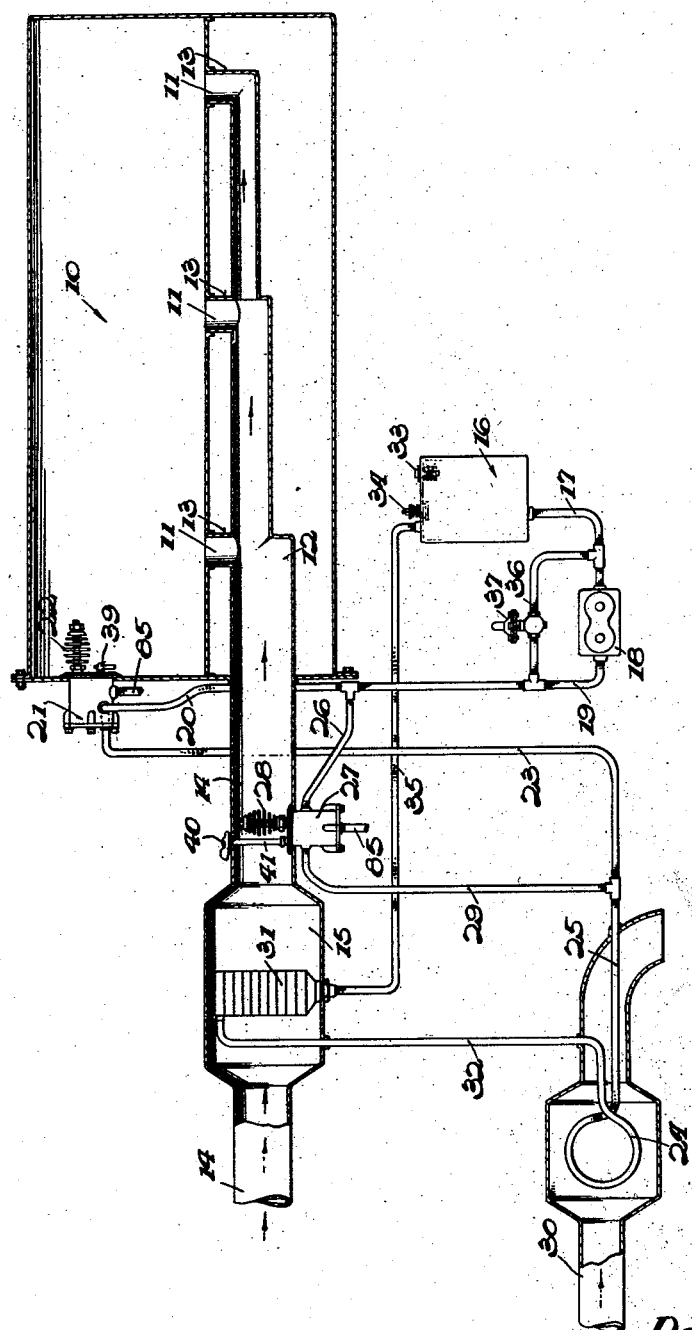

2,381,346

UNITED STATES PATENT OFFICE 2,381,346

REGULATOR

David Gregg, Caldwell, N. J., assignor to Bendix Aviation Corporation, South Bend, Ind., a corporation of Delaware Original application December 6, 1941, Serial No. 421,979, now Patent No. 2,316,417, dated April 13, 1943. Divided and this application September 18, 1942, Serial No. 458,879

2 Claims. (Cl. 137—139)

This invention relates to heating systems, and more particularly to thermostatic control means for heating systems intended for heating aircraft cabins.

Aircraft cabin heating systems in use today are usually of the steam type, wherein a flash boiler situated in the engine exhaust stack is employed as the steam generating unit for a system including a steam radiator disposed in the air intake conduit of the craft. One of the serious problems encountered in heating cabins is that of obtaining even and uniform heat control throughout the cabin under a wide range of external air temperatures, and the conventional systems have failed to effect suitable heat control required for modern transports.

It is an object of the present invention to provide a sensitive thermostatic control element for regulating the flow of steam or other hot fluid in a heating system.

It is a further object of the invention to provide a thermostatic control of air in plural stages to minimize the temperature change through which the air need be raised upon a demand for heat.

It is another object of the invention to include the provision of a novel thermostatic control device for regulating the flow of fluid to a boiler or other heat generating device.

Other objects will appear from a study of the following specification when made in conjunction with the attached drawings, throughout which like numerals designate like parts.

Fig. 1 is a schematic diagram of a steam heating system showing the use of the novel thermostatic regulating valve of the present invention.

Fig. 2 is a longitudinal, sectional view of a thermostatic flow control unit of the present invention.

Fig. 3 is a cross-sectional view of the unit shown in Fig. 2, taken along the line 3—3 of Fig. 2.

Fig. 4 is a side elevation of the unit shown in Fig. 2; and

Fig. 5 is a front or end elevational view of the same unit.

Having reference to Fig. 1, there is shown an aircraft cabin 10, into which open a plurality of vents 11 of an airduct 12, having branch members 13. Air from the atmosphere is received through a duct 14 containing an enlarged portion 15, which in turn is connected directly to the airduct 12 within cabin 10.

One form of a steam heating system employing the flow regulating valve of the present invention is set forth in Fig. 1. This system is fully described and claimed in the application of David Gregg, Serial No. 421,979, filed December 6, 1941, now U. S. Patent No. 2,316,417, dated April 13, 1943, of which the present application is a division. A water supply tank 16 is connected by a water pipe 17 to a boiler feed pump 18 of conventional design, the output of which is connected through another water pipe 19 to two parallel branches including first, a water conduit 20, a thermostatic flow control element 21 having a thermal transfer head 22 projecting into cabin 10, and a water delivery pipe 23, which is connected to the input of the flash boiler 24 by means of a conduit 25. The second branch includes a water supply pipe 26 connected to another thermostatic flow control device 27 having a thermal transfer head 28, the output of which is connected, by means of a water delivery pipe 29, to conduit 25 and boiler 24. Boiler 24 is contained in the exhaust stack 30 of an aircraft engine (not shown), and the output of flash boiler 24 communicates with a steam radiator 31 through a steam pipe 32.

The thermostats or thermostatic flow control devices 21 and 27, will be explained in detail below, but primarily, their function is to permit water to flow through their respective branches into the boiler 24 until a particular temperature for the surrounding air has been attained, upon which water flow through one or both of the branches may be stopped.

Water tank 16 may be provided with a pressure relief valve 33 of any conventional design in order to prevent the possibility of destruction of the tank by high steam pressure, and with a vacuum valve 34, of any conventional design, which serves to prevent the formation of low pressures within tank 16 upon condensation of steam therein.

Water from tank 16 is pumped through the boiler feed pump 18, through the branch pipes 20 and 26, then through the branch delivery pipes 23 and 29 into the boiler 24, wherein steam is formed, which will flow into radiator 31 and heat the surrounding air, after which, steam or condensed steam returns to water supply tank 16 by way of a return conduit 35.

Under certain conditions of operation, both flow control elements 21 and 27 will cut off flow to boiler 25, and since boiler feed pump is intended to operate continuously, a by-pass conduit 36 is provided to prevent excessive pressures from building up when flow through control elements 21 and 27 is stopped. A relief valve 37 is connected to the by-pass conduit 36 to permit return of water automatically from water pipe 19 back to the input of pump 18 when the pressure due to the cut-off of fluid flow through both branches 20 and 26 becomes excessive.

The particular cabin temperature desired may be selected and maintained in the manner to be described later, and for the purposes of explanation of the invention, we may assume that it is desired to maintain a temperature of 70 degrees F. within cabin 10. The entering air may be on the order of zero degrees F., and will be heated upon contact with radiator 31. It is proposed that water shall be fed to the boiler 24 through the thermostatic control device 27 independently of water flowing through the thermostatic control device 21, until the temperature of the air passing by the thermal transfer head 28 shall be equal to the temperature desired within cabin 10. In this case, we will assume that control device 27 acts to stop flow of water therethrough when the air passing through conduit 12 adjacent the head 28 is 70 degrees.

Air entering the cabin at 70 degrees will be too cool to maintain the cabin temperature at 70 degrees under normal conditions, and therefore, the thermostatic control device 21 will permit water to be delivered therethrough to boiler 24 until the air adjacent the thermostatic head 28 shall attain the temperature of 70 degrees. Prior to the cut-off of water flow through thermostatic control device 27—that is, prior to the attaining of 70 degrees F. in the neighborhood of thermo-transfer head 28, water will be flowing to boiler 24 through both parallel branches passing through control devices 21 and 27. The capacity of boiler 24 is such that it can readily convert water that is fed to it through both branches into steam. Therefore, the cold air entering conduit 14 will be warmed rather readily, and once it has been warmed to 70 degrees, the volume of steam necessary to increase the temperature of the air flowing into cabin 10 through vents 11, in order to maintain 70 degrees in cabin 10, need be only that amount supplied through the thermostatic flow control element 21.

A knob 39 projects from the casing of thermostat 21, and, as will be described below, the cabin temperature at which water is to be cut off through thermostat 21, may be selected through a suitable setting of the knob. A similar knob 40 is carried on a shaft 41 projecting through the casing of thermostat 27 and also to a point outside the air duct 14.

The thermostatic control devices 21 and 27 may incorporate identical thermo-sensitive and regulating valve structure, and therefore, in Figs. 2 to 5, the description of these parts of the thermostatic control device 21 is applicable to device 27.

Housing 38 has an open end fitted with a closure plate 42, which is held in gas-tight engagement with housing 31 by means of a plurality of screw-studs 43.) This housing also has a screw-threaded aperture 44, which carries a gland nut 45, having an integral extension forming the thermo-transfer head 22. This head carries a series of heat radiating fins 46 exteriorly of a cylindrical chamber 47. A flexible metallic bellows or sylphon 48 has one end welded or brazed to a metallic collar 49 fitted tightly within gland nut 45, which has one end welded to gland nut 45 at point 50. The other end of flexible bellows 48 has a gas-tight connection with the flat end face 51 of a plunger 52. The outermost end of chamber 47 is formed into a screw-threaded boss 53, upon which is carried a screw-threaded cap 54, which fits upon boss 53 with a gas-tight connection. It will thus be seen that chamber 47 is a gas-tight chamber of variable volume by virtue of the flexible bellows 48. A quantity of air or any other gas, or a liquid such as alcohol, carbon tetrachloride, or the like, is allowed to flow through screw-threaded boss 53 prior to the application of cap 54, and thus, the fluid within chamber 47 may be at any desired pressure.

Plunger 52 extends within housing 38 and carries at its end a knife edged bearing point 55, which rests against one end 56 of a loose link 57, contacting, at its other end 58, with a valve rod 59. Valve rod 59 extends within a valve chamber 60, which has transverse openings 61 and 62 opening thereinto and aligned with each other. A piston valve 63 is carried on valve rod 59, and in the position shown in Fig. 2, it closes off communication between transverse openings 61 and 62, but when moved to the extreme left position by the action of plunger 52 on link 57, the valve clears openings 61 and 62 so as to permit communication between these openings. A helical spring 65 bears against the left-hand face of valve 63 and acts to return valve 63 to the closed position shown under conditions to be later described. A pin 64 on valve 63 serves as a guide and centering means for spring 65.

Link 57 is pivoted, by means of a pin member 66, to the parallel arms 67 of a bracket member 68. The horizontally disposed portion of bracket 68, as viewed in Fig. 2, is a hollow cylindrical member 69 confined within a cylindrical casing 70, having an inwardly extending flange 71 at its right end, and enlarged boss portion 80 at its left end, forming an integral end wall of housing 38. A piston 72 is confined within cylindrical casing 70 and is slidable therein, and is retained on cylindrical portion 69 of bracket 68 by means of a conventional retaining ring 73. A helical spring 74 has one end bearing against inwardly directed flange 71, and its other end bearing against the inner face of piston 72. Action of spring 74 is such that the end face 75 of bracket 68 is urged to the left against the cam face 76 of a cylindrical cam member 77. Cam member 77 carries a stub shaft 78, which is borne within an aperture 79 formed in the end wall of casing 38, and terminates in the knob 39.

Housing 38 has a peripherally extending attaching flange 81 for attachment, by any conventional means, to the wall of cabin 10. Cylindrical casing 70 has a series of apertures 82 toward the left end thereof, which open into valve chamber 60, which also has an opening 83 formed below valve chamber 60, and into which is fitted a screw-threaded pipe connecting member 84 carrying a drain pipe 85.

The front or manual control end of flow control element 21 is shown in Fig. 5. An arcuate scale member 86 is shown disposed above the index end of knob 39, and this scale bears indicia of a temperature range through which the thermostat is designed to exert control. It will be understood that the knob 39 is readily accessible to the steward or any person in the cabin 10 who desires to set the thermostat for a particular cabin temperature. The knob 40 of thermostat 27, which performs the same function as does knob 39, will ordinarily be accessible for periodic adjustment by a crew member, so that the temperature of entering air may be regulated by a flight or maintenance crew member, although it is intended that thermostat 27 be set before a particular flight to a fixed cut-off temperature, and not be adjusted during flight.

It is believed that the operation of the system of Fig. 1 will be clear from the above description, and the operation of thermostats 21 and 27 to control the flow of water to boiler 24 will be fully understood from the above description, taken with the following explanation, particular reference being made to Figs. 2 and 3:

The volume of chamber 47 depends upon the temperature of the fluid therein, which, of course, is a function of the temperature of the air surrounding the heat transfer head 22. As the temperature local to head 22 increases, the volume of chamber 47 will become greater due to the increased pressure of the fluid contained therein, and plunger 52 will be moved to the right. Upon a lowering of the temperature about head 22, the fluid within chamber 47 will become cool, the volume of chamber 47 will therefore become less, and plunger 52 will move to the left. The fins 46 aid in the rapid transfer of heat to chamber 47 from the surrounding air or from chamber 47 to the surrounding air, depending upon the direction of temperature change.

Assuming that knob 39 has been set for a cut-off temperature of 70 degrees F., and that the air surrounding head 22 is at less than this temperature, then plunger 52 is retracted somewhat into chamber 47, and the thermostatic control device is so designed that in this retracted position of plunger 52, spring member 65 forces valve 63 to the right of the position shown, and thus, through the movement of valve rod 59 to the right, the upper end 56 of link 57 will move counter-clockwise about the pivot pin 66. Flow of water into valve chamber 60 through opening 61, and from chamber 60 and opening 62 through delivery pipe 23 will be established. Of course, as the water thus flows through thermostat 21, it is delivered to create steam in the boiler 24, and thus, the temperature of air adjacent the heat transfer head 22 increases. As the gas pressure in chamber 47 increases with temperature, the plunger 52 is moved progressively to the right, and when the selected cabin temperature has been attained, valve 63 will have been forced by the right-hand movement of plunger 52, as transmitted through link 57 and valve rod 59, to close transverse openings 61 and 62, and thus, stop flow of water through thermostat 21.

With cabin temperature at 70 degrees, and thermostat 21 in its cut-off condition, as shown in Fig. 2, if the control knob 39 is moved to maintain a lower cabin temperature, for example 65 degrees, then cam face 76 presents a contact point of less axial projection to end face 75, and spring 74 forces piston 72 and bracket 68 to the left. Since the position of plunger 52, and therefore, bearing point 55, is fixed by the temperature within chamber 47, translation of bracket 68 to the left will cause the end 58 of link 57 to force valve rod 59 further to the left, and of course, this movement merely continues to keep openings 61 and 62 out of communication, so that water flow is prohibited. The temperature about head 22 will continue to decrease, and the gas in chamber 47 will gradually cool, allowing plunger 52 to be retracted into chamber 47. This retraction moves bearing point 55 to the left, and spring 65 acts to rotate link 57 counter-clockwise about pin 66 until the air about head 22 falls to 65 degrees temperature, at which point valve 63 has moved to the right sufficiently to establish water flow through openings 61 and 62, and water is then fed to boiler 24. The resultant steam raises the temperature about head 22, and at 65 degrees, plunger 52 has traveled to the right sufficiently to again move valve 63 to cut-off position, thus stopping the formation of steam and the further rise of temperature in cabin 10.

It will be seen that thermostatic control device 21 thus acts to maintain a predetermined temperature in cabin 10, and that the flow of water to boiler 24 is permitted only when heat is demanded to raise the cabin temperature to its desired level. Small amounts of water that may settle in the chamber 60 are carried back to tank 16, or are otherwise disposed of through the drain pipe 85.

While only one embodiment of the present invention has been shown in the drawings, it is to be understood that various changes may be made without departing from the scope of the present invention. For this reason, it is intended not to limit the invention by the description herein given as an example, but solely by the scope of the appended claims.

What is claimed is:

1. A flow control device comprising a housing, a plunger within said housing, a bracket within said housing, a cylindrical casing surrounding a portion of said bracket, a piston carried on one end of said bracket within said cylindrical casing, a cam having engagement with the end surface only of said bracket, a spring within said casing bearing against said piston and urging said piston and bracket toward said cam, a flow control valve within said housing, means for urging said valve into open position, a link pivoted to said bracket intermediately of its ends, one end of said link being in engagement with said plunger and the other end of said link being in engagement with a valve rod connected to said valve and means for adjusting said cam to translate said bracket and link to modify the control of said plunger on said valve through said link and valve rod.

2. In a flow control device, a housing, a pair of independently movable members shiftably mounted in said housing, an element pivotally carried by one of said members and movable therewith and relative thereto and engaging said other member for controlling the actuation of the latter, operating means engaging said element and operable for pivoting said element to effect said actuation, a valve connected to said other member and operated thereby, a cam engaging said first member and operable to a plurality of selectable operating positions each effective for shifting said first member to establish an effective operating range for said operating means to enable the latter to render said valve effective in conformity to the position of the cam, resilient means within said housing effective for maintaining said members in engagement with said cam and said element respectively and said element in engagement with said operating means at all times to effect positive shifting of said members upon operation of said cam.

DAVID GREGG.